United States Patent
Huemer et al.

[11] Patent Number: 5,775,270
[45] Date of Patent: Jul. 7, 1998

[54] THERMOSTATIC VALVE FOR THE COOLANT CIRCULATION SYSTEM OF AN INTERNAL-COMBUSTION ENGINE

[75] Inventors: Gerhart Huemer, Neukeferloh; Heinz Lemberger, Unterfoehring; Peter Leu, Denkenforf; Manfred Kurz, Ditzingen; Roland Saur, Stuttgart, all of Germany

[73] Assignee: Behr Thermot-Tronik GmbH & Co., Kornwestheim, Germany

[21] Appl. No.: 696,994

[22] PCT Filed: Dec. 20, 1995

[86] PCT No.: PCT/EP95/05053

§ 371 Date: Aug. 21, 1996

§ 102(e) Date: Aug. 21, 1996

[87] PCT Pub. No.: WO96/19762

PCT Pub. Date: Jun. 27, 1996

[30] Foreign Application Priority Data

Dec. 21, 1994 [DE] Germany ............... 44 45 761.8

[51] Int. Cl.⁶ ............................................. F01P 7/14
[52] U.S. Cl. ................. 123/41.1; 236/34.5; 236/68 R
[58] Field of Search ................. 123/41.1; 236/34.5, 236/68 R

[56] References Cited

U.S. PATENT DOCUMENTS 5,385,296  1/1995  Kurz .................................. 123/41.1

FOREIGN PATENT DOCUMENTS

| | | |
|---|---|---|
| 0 448 315 A2 | 9/1991 | European Pat. Off. |
| 13 01 179 | 8/1969 | Germany. |
| 18 14 223 | 10/1969 | Germany. |
| 21 13 388 | 10/1971 | Germany. |
| 17 98 294 | 2/1972 | Germany. |
| 24 59 664 | 7/1975 | Germany. |
| 26 25 561 | 12/1977 | Germany. |
| 79 20 923 | 10/1979 | Germany. |
| 30 18 682 C2 | 11/1980 | Germany. |
| 29 31 682 | 2/1981 | Germany. |
| 31 38 368 | 4/1983 | Germany. |
| 32 40 939 | 5/1983 | Germany. |
| 33 31 847 A1 | 3/1985 | Germany. |
| 33 31 847 C2 | 3/1985 | Germany. |
| 34 00 699 | 7/1985 | Germany. |
| 240 826 A3 | 11/1986 | Germany. |
| 241 839 A3 | 1/1987 | Germany. |
| 35 39 425 | 5/1987 | Germany. |
| 39 30 084 | 3/1991 | Germany. |
| 40 35 179 | 5/1992 | Germany. |
| 42 33 913 A1 | 4/1994 | Germany. |

OTHER PUBLICATIONS

Ullmanns Enclyklpaedie der technischen Chemie, 4., neubearbeitete und erweiterte Auflage, Band 7, Acaricide—Antihistaminica, Verlag Chemie, Weinheim/Bergstr., pp. 298–301.

*Primary Examiner*—Noah P. Kamen
*Attorney, Agent, or Firm*—Evenson, McKeown, Edwards & Lenahan, P.L.L.C.

[57] ABSTRACT

For a thermostatic valve in the coolant circulation system of an internal-combustion engine having an expansion material element penetrating the main valve for the cold-side stationary support and the hot-side driving connection with the valve disk of the main valve, it is provided for increasing the response characteristic of the thermostatic valve to act upon the expansion material element in the cold-side end section in addition by a hot coolant and/or to provide a metal film resistor as an electric heating device placed in the expansion material.

24 Claims, 1 Drawing Sheet

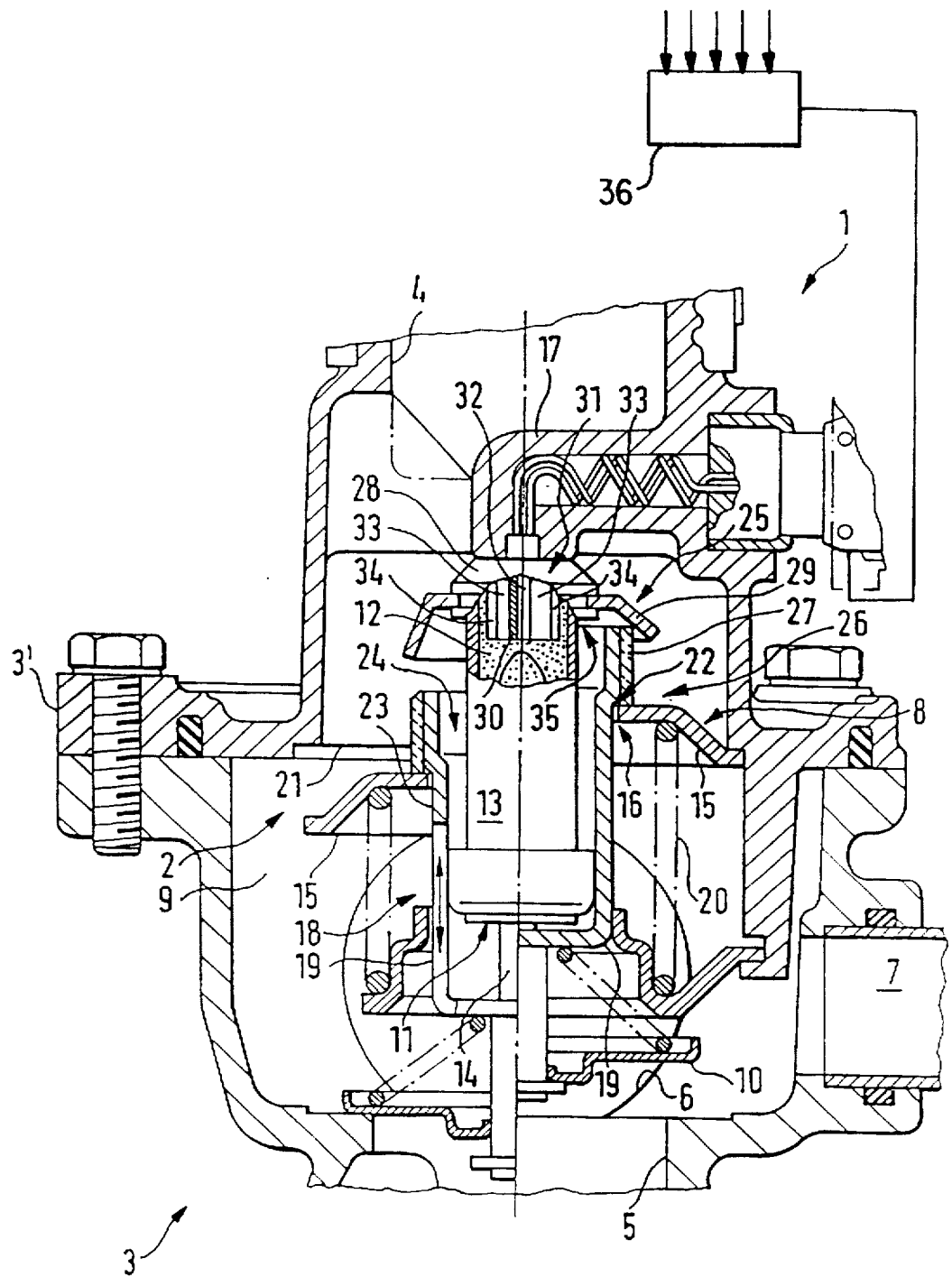

THERMOSTATIC VALVE FOR THE COOLANT CIRCULATION SYSTEM OF AN INTERNAL-COMBUSTION ENGINE

BACKGROUND AND SUMMARY OF THE INVENTION

This invention relates to a thermostatic valve for the coolant circulation system of an internal-combustion engine.

A thermostatic valve with a separate heat supply device designed as an electric heating device is known, for example, from German Patent Document DE-A 42 33 913. In the case of this thermostatic valve, the capsule of the expansion material element which stores the expansion material is covered by means of a cap made of plastic in the cold-side end section containing the heating device. The cap, which has an insulating effect with respect to a cold coolant upstream of the main valve, extends along the capsule in such a manner that it reaches through the opening of the valve disk and, by means of a sealing agent, seals off the opening along a first opening lift section of the valve disk. During a further opening lift, cold coolant flows by way of the ring gap formed between the opening and the outer circumference of the capsule to the hot-side end section of the capsule or of the expansion material element for the purpose of cooling the expansion material stored in the capsule.

In the case of a thermostatic valve with an electrically driven heating device, the latter can be connected and disconnected as a function of characteristic diagram quantities, particularly of the internal-combustion engine. For the case of a relatively high coolant temperature, set preferably to above 100° C., in the cooling circulation system of the internal-combustion engine, a fast-reacting thermostatic valve is required for the fastest possible adaptation of the coolant temperature to a changed load requirement.

The initially described thermostatic valve operates relatively slowly for a corresponding coolant temperature adaptation in the case of fast load cycles of different dimensions because, on the one hand, the portion of the expansion material capsule which is directly acted upon in a hot manner is relatively small in comparison to the proportion covered by the insulating cap and because, on the other hand, the PTC-element provided as the electric heating device, as the PTC-resistor, has a sluggish response characteristic corresponding to its mass.

It is an object of the invention to improve, in the case of a thermostatic valve of the initially mentioned type, the additional heat supply device in such a manner that a faster response characteristic of the thermostatic valve is achieved.

This and other objects have been achieved according to the present invention by providing a heat supply device as a toroidal chamber which has a hot-side coolant connection and is assigned to the expansion material capsule in the cold-side end section on the other side of the valve disk.

It is the basic idea of the invention to act upon a portion of the cold-side end section of the expansion material element or of the expansion material capsule by means of the toroidal chamber while the main valve blocks the flow-through of the cold coolant completely or by way of a predetermined opening lift partially with a hot coolant. In this manner, a relatively large expansion material proportion is advantageously heated more rapidly by way of short heat conducting paths through the jacket of the expansion material capsule by means of the hot coolant and is also maintained at a higher temperature level. By means of this higher temperature level, the difference with respect to the control temperature of the expansion material element is reduced, resulting in a faster response of the thermostatic valve.

A preferred embodiment of the invention is characterized in that a pipe section, which is arranged in the opening of the valve disk and protrudes on the cold-side, together with the outer circumference of the expansion material capsule, forms the coolant-containing toroidal chamber which, on the cold side, has an opening which is controlled as a function of a predetermined lift of the valve disk or of the pipe section. The advantage of this toroidal chamber designed according to the invention is that, starting from a predetermined larger opening lift, it is also used as a bypass for cold coolant.

The effect of the toroidal chamber filled with hot coolant can advantageously be further improved in that the pipe section is either manufactured of an insulating material or, as a metallic pipe section, is provided with a heat-retaining insulating layer.

In a further development of the thermostatic valve provided with a toroidal chamber, the cold side end section of the expansion material capsule is stationarily supported by an insulating cap which, in its toroidal-chamber-side dimension, carries an elastic closing element which, along a predetermined lift of the valve disk, interacts closely with the pipe section until the toroidal chamber is controlled open. This opening-up of the toroidal chamber as the bypass for cold coolant which according to the invention is delayed as a function of the lift avoids disadvantageous instabilities particularly at the beginning of the opening of the main valve. Furthermore, the toroidal chamber, which acts as a bypass, causes an intensive action of cold coolant on the expansion material capsule, whereby an overshooting in the direction of lower control temperatures is avoided.

It is known that it is the purpose of the thermostatic valves preferably used in liquid circulation systems and of the thermostatic switches used preferably in electric circuits to maintain a predetermined desired temperature value.

In order to more precisely maintain the respective desired temperature, it is also known in the case of thermostatic valves with expansion material elements of the above-mentioned type to provide an electric heating resistor in the expansion material which, for example, according to German Patent Document DE-C 30 18 982 can be energized as a function of at least one state quantity of an internal-combustion engine. As the electric heating resistor in the respective expansion material of an expansion material element, a PTC-resistor can be provided which, in addition to being described in the type-forming German Patent Document DE-A 42 33 913 is also indicated in the German Patent Documents DE-OS 1 798 294, DE-OS 1 814 223 and DE-OS 26 25 561.

A PTC-resistor is also used in the case of the thermostatic switch called "thermostat" in German Patent Document DE-A 21 13 388. In contrast, in German Patent Document DE-U 79 20 923, a thick-film resistor is described as an electric heating element for a thermostatic switch. Finally, the newer German Patent Document DE-A 33 31 847 describes a film or thick-film resistor as an equivalent alternative with respect to a PTC resistor. Finally, on the basis of German Patent Document DE-A 35 39 425, an advanced thermostatic switch has become known in the case of which a carrier made of aluminum oxide ceramics carries a film resistor or metal film resistor or a thick-film resistor. According to the statements in Column 2, last sentence, Page 300, of Volume 7 of Ullmanns Encyklopädie der technischen Chemie (Ullmann's Encyclopedia of Technical Chemistry), published in 1974, aluminum oxide ceramics are excellent technical insulators which, in addition, have a good caloric conductibility and, according to German Patent Document DE-A 35 39 425, a low heat capacity.

With respect to this prior art, another solution of the object on which the present invention is based provides that, as the heat supply device, an electric film resistor, preferably a metal layer resistor, is placed as a heating element in the expansion material of the capsule in the cold-side end section of the capsule.

It is known that metal film resistors have a high heating capacity while the current requirement is advantageously low, in which case they also have a faster response characteristic because of the lower mass. For a rapid heat dissipation, the respective film resistor is arranged on a metal lug or a metal or ceramic body or high caloric conductibility, for example, on an aluminum oxide ceramic plate. The preferred use of this material for the conduction of heat is known per se from German Patent Document DE-A 33 31 847.

The heat dissipation into the expansion material is further improved in that heat conducting blocks made of a substance/material of a high caloric conductibility are assigned to the respective film resistor, the heat conducting blocks having heat transmission surfaces to the expansion material which are enlarged by ribs. In order not to unfavorably influence the response characteristic of the thermostatic valve, the heat conducting blocks are each made of a light metal.

It is true that, on the basis of German Patent Document DE-A 24 59 664, it is known with respect to a thermorelay to connect, for the effective conduction of heat from a PTC heating resistor, in a heat-conducting manner, this resistor with a relay housing made of copper or aluminum. Furthermore, from German Patent Document DE-A 29 31 682, a thermostat is known which has an electrically heatable expansion material element whose housing has an enlarged heat emission surface to the expansion material for the purpose of a faster heat transport into the expansion material by means of ribs and/or folds. However, this known prior art shows no heat conducting blocks made of a light metal which are connected with a metal film resistor in a heat-conducting manner.

The measure of the increased heat conduction is additionally promoted in that the expansion material in the capsule is mixed with a metal powder which increases the heat conduction, as known per se from German Patent Documents DD 240 826 and DD 241 839. A copper or aluminum powder is preferably suggested as the metal powder for heating unit thermostats. Instead of an electrically conductive aluminum powder, an electrically non-conductive powder of aluminum oxide ceramics is also conceivable which, as indicated above, have a good caloric conductibility while the heat capacity is low.

Each of the above-described solutions according to the invention in each case causes a faster response characteristic of a thermostatic valve according to the object. A thermostatic valve with an optimal response characteristic is achieved by means of the combination of the toroidal chamber and the electric film resistor both, resulting in a fast response of the thermostatic valve while the electric heating output is low.

These and other objects, features and advantages of the present invention will become more readily apparent from the following detailed description when taken in conjunction with the accompanying drawings.

BRIEF DESCRIPTION OF THE DRAWINGS

The single drawing FIGURE illustrates a partial sectional view of thermostatic valve according to a preferred embodiment of the present invention.

The drawing is a partial sectional view of the thermostatic valve, specifically, in the right half of the figure, of a main valve in the closed position and, in the left half of the figure, of the main valve in its opened position.

An arrangement 1 for controlling/regulating the temperature of a cooling liquid in a coolant circulation system of a liquid-cooled engine (internal-combustion engine) not shown in detail comprises a thermostatic valve 2 in a housing 3. The housing 3 is connected with a radiator return flow device 4, an engine return flow device 5 and an engine forward flow device 6 as well as optionally with a heat connection 7. A main valve 8 of the thermostatic valve 2 controls/regulates the inflow of the relatively cold coolant from the radiator return flow device 4 into a mixing chamber 9 of the arrangement 1. A short-circuit valve 10, which is in a driving connection with the main valve 8, as a function of the lift, controls the inflow of the engine-hot coolant from the engine return flow 5 into the mixing chamber 9, from which the coolant is then supplied by way of the engine forward flow 6 to the cooling circulation system of the engine or of the internal-combustion engine.

The main valve 8 and, together with it, the short-circuit valve 10, are actuated as a function of the temperature by means of an expansion material element 11 which comprises a capsule 13 storing an expansion material 12, an actuating element 14 being arranged in an extendable and retractable manner on one end of the capsule 13 under the effect of the expansion material 12 which changes its volume as a function of the temperature.

The arrangement of the expansion material element 11 relative to the main valve 8 which, on the one hand, is acted upon in a cold fashion by the coolant in the radiator return flow device 4 and, on the hand, is acted upon in a hot fashion by the coolant in the mixing chamber 9 is carried out such that the expansion material element 11 with its capsule 13 penetrates the valve disk 15 of the main valve 8 by way of an opening 16, for a cold-side stationary support on a housing-side abutment 17.

By means of the above-described arrangement of the expansion material element 11, an actuating element 14 is obtained which is arranged in the hot-side end section 18 of the expansion element 11 and which is in a driving connection with the valve disk 15 of the main valve 8 by way of an actuating linkage 19. In the closing direction, the valve disk 15 is biased by a spring 20 toward a valve seat 21 in the housing part 3'. In the opening direction, the valve disk 15 is acted upon by a shoulder 22 on a pipe section 23.

The pipe section 23 which protrudes on the cold side and is arranged in the opening 16 of the valve disk 15 is part of the actuating linkage 19 interacting with the actuating element 14 of the expansion material element 11. This pipe section 23, which is open on both sides, by means of the outer circumference of the expansion material capsule 13, bounds a coolant-containing toroidal chamber 24 which, on the cold side on the other side of the valve disk 15, as a function of a predetermined lift of the valve disk 15, can be closed or is held closed by means of a closing element 25 assigned to its opening 35.

As illustrated by the single figure, the toroidal chamber 24, when the main valve 8 is closed as well as by way of a first opening lift, is further closed by the closing element 25 and is therefore acted upon by the relatively hot coolant from the mixing chamber 9. This achieves an intensive warming of the expansion material 12 also in the cold-side end section 26 of the expansion material element 11, whereby a higher temperature level occurs also. By means of this higher temperature level, the difference with respect to the regulating temperature of the expansion material element 11 is also reduced, with the advantage of a faster response of the thermostatic valve 2.

The effect of the toroidal chamber 24 filled with a relatively hot coolant is additionally increased by an insulating layer 27.

The expansion material element 11 or the capsule 13 is stationarily supported in the cold-side end section 26 by way of an insulating cap 28, on the housing-side abutment 17. The insulating cap 28, in the direction of the toroidal chamber 24, has a dimension which is sufficient for the arrangement of the closing element 25. The closing element 25 is a collar 29 which is elastic in the lifting direction and which by way of a predetermined lift of the valve disk 15 interacts closely with the pipe section 23 or the insulating layer 27. As illustrated in the left half of the figure, when the collar 29 is removed from the pipe section 23, a bypass for cold coolant from the radiator return flow device 4 is achieved by way of the toroidal chamber 24 in order to achieve a faster cooling of the expansion material for a more rapid closing of the main valve 8.

The closing element 25 may also be an O-ring (not shown) which is arranged on the insulating cap 28 or on the expansion material capsule 13.

In order to make the response characteristic of the thermostatic valve 2 even more sensitive, the expansion material element 11 has an additional heat supply device in the cold-side end section 26 of the capsule 13. This heat supply device is a heating element 31 which is formed by an electric film resistor 30 and which is placed in the expansion material 12 of the capsule 13. The film resistor 30 is preferably made of metal and is arranged on a metal or a ceramic lug 32 with a large surface selected by its shaping, —for example, as a cylinder or cube or parallelepiped, and with a high caloric conductibility.

Heat conducting blocks 33 made of a material of a high caloric conductibility are assigned to the metal film resistor 30, the heat conducting blocks 33 having heat transmission surfaces to the expansion material 12 which are enlarged by ribs 34. In addition, heat conducting elements in the expansion material of a thermostat are known per se from German Patent Document DE-A 34 00 699.

The metal film resistor 30 is, for example, arranged on a lug 32 made of aluminum oxide ceramics, the assigned heat conducting blocks 33 in each case being formed of a light metal, for example, of an aluminum alloy. For a better heat conduction in the expansion material 12 of the capsule 13, this expansion material 12 is mixed with a metal powder, such as an aluminum powder, which increases the conduction of heat.

The above-described solution according to the invention for increasing the response characteristic of a thermostatic valve includes conducting a hot coolant to the cold-side end section 26 of the expansion material element 11 by means of a toroidal chamber 24 when the main valve 8 is in the closing area. In the case of a thermostatic valve 2 without a toroidal chamber 24, a comparable effect is achieved by the above-described further solution according to the invention of an electric heating achieved by means of a metal film resistor 30. For an optimal response characteristic of a thermostatic valve 2, both above-described solutions of the invention are combined, particularly for an electric heating element 31 which can be switched on and off by a controll unit 36 as a function of characteristic diagram quantities, or operating parameters of an internal-combustion engine.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Thermostatic valve for a coolant circulation system of an internal-combustion engine, comprising:

a main valve which is disposed between a cold-side end section and a hot-side end section and which has a valve disk;

an expansion material element which is drivingly connected with the main valve in the hot-side end section and which is stationarily supported in the cold-side end section, said expansion material element being configured to actuate the main valve as a function of coolant temperature, said expansion material element including a capsule which penetrates an opening in the valve disk of the main valve, the capsule containing an expansion material which acts upon an actuating element which is arranged in one of the end sections; and a hollow structure arranged around the capsule such that a chamber is defined between the capsule and the hollow structure, the chamber being communicated with a hot-side coolant connection and extending in the cold-side end section.

2. Thermostatic valve according to claim 1, wherein the chamber is a toroidal chamber defined by an outer circumference of the expansion material capsule and by a pipe section which is arranged in the opening of the valve disk and which protrudes on the cold-side end section, said toroidal chamber having an opening in the cold-side end section which is controlled as a function of a predetermined lift of at least one of the valve disk and the pipe section.

3. Thermostatic valve according to claim 2, wherein the pipe section is at least one of made of an insulating material and provided with a heat-retaining insulating layer.

4. Thermostatic valve according to claim 3, wherein the expansion material capsule is stationarily supported in the cold-side end section via an insulating cap, a closing element being arranged on said insulating cap to close the opening of the toroidal chamber.

5. Thermostatic valve according to claim 4, wherein the closing element is one of an elastic collar which is elastic in the lift direction and an O-ring, and wherein said closing element closely interacts with the pipe section along a predetermined lift of the valve disk.

6. Thermostatic valve according to claim 2, wherein the expansion material capsule is stationarily supported in the cold-side end section via an insulating cap, a closing element being arranged on said insulating cap to close the opening of the toroidal chamber.

7. Thermostatic valve for a coolant circulation system of an internal-combustion engine, comprising:

a main valve which is disposed between a cold-side end section and a hot-side end section and which has a valve disk;

an expansion material element which is in a lift driving connection with the main valve in the hot-side end section and which is stationarily supported in the cold-side end section, said expansion material element being configured to actuate the main valve as a function of coolant temperature, said expansion material element including a capsule which penetrates an opening in the valve disk of the main valve, the capsule containing an expansion material which acts upon an actuating element which is arranged in one of the end sections;

an electric film resistor arranged in the expansion material of the capsule as a heat supply device; and a hollow structure arranged around the capsule such that a chamber is defined between the capsule and the hollow structure, the chamber being communicated with a hot-side coolant connection and extending in the cold-side end section.

8. Thermostatic valve according to claim 7, wherein the chamber is a toroidal chamber.

9. Thermostatic valve according to claim 8, wherein the film resistor is a metal film resistor, which is arranged on a lug formed from at least one of metal and ceramic.

10. Thermostatic valve according to claim 8, further comprising heat conducting blocks connected to the metal film resistor, the heat conducting blocks having heat transmission surfaces exposed to the expansion material, said heat transmission surfaces comprising ribs.

11. Thermostatic valve according to claim 10, wherein the metal powder is an aluminum compound.

12. Thermostatic valve according to claim 7, wherein the film resistor is a metal film resistor, which is arranged on a lug formed from at least one of metal and ceramic.

13. Thermostatic valve according to claim 12, wherein the metal or ceramic body is formed in the shape of one of a cylinder, a cube, or a parallelepiped.

14. Thermostatic valve according to claim 7, further comprising heat conducting blocks arranged around the metal film resistor, the heat conducting blocks having heat transmission surfaces exposed to the expansion material, said heat transmission surfaces comprising ribs.

15. Thermostatic valve according to claim 7, wherein the lug carrying the metal film resistor as well as the heat conducting blocks are each formed of a metal compound, and wherein the expansion material in the capsule is mixed with a metal powder which increases heat conduction.

16. Thermostatic valve according to claim 7, wherein the metal film resistor is regulated by a control device as a function of operating parameters of the internal-combustion engine.

17. Thermostatic valve for a coolant circulation system of an internal-combustion engine, comprising:

a housing defining a mixing chamber;

a main valve including a valve disk, the main valve being arranged in said housing to divide the mixing chamber into a cold-side section and a hot-side section, the cold-side section being communicated with a radiator return coolant flow, the hot-side section being communicated with an engine forward coolant flow;

an expansion element which is stationarily supported in the cold-side section and which penetrates an opening in the valve disk of the main valve, the expansion element containing an expansion material which acts upon an actuating element operatively connected with the valve disk; and a pipe section arranged around the expansion element, a chamber being defined between the expansion element and the pipe section, the chamber being communicated with coolant in the hot-side section and extending in the cold-side section.

18. Thermostatic valve according to claim 17, wherein the pipe section operatively connects the actuating element with the valve disk.

19. Thermostatic valve according to claim 17, wherein the hot-side section is further communicated with an engine return coolant flow, and a short circuit valve is arranged in the hot-side section to regulate the engine return coolant flow.

20. Thermostatic valve according to claim 19, wherein the short circuit valve is operatively connected with the actuating element.

21. Thermostatic valve according to claim 17, further comprising an opening in the pipe section in the cold-side section, and further comprising a closing element arranged to close the opening in the pipe section when the valise disk is in a closed position.

22. Thermostatic valve according to claim 21, wherein the actuating element is operatively connected with the pipe section such that the pipe section is moved away from the closing element as the valve disk is moved from the closed position to an open position.

23. Thermostatic valve according to claim 17, further comprising an electric film resistor arranged in the expansion material of the capsule as a heat supply device.

24. Thermostatic valve according to claim 17, wherein said chamber is toroidal.

* * * * *

UNITED STATES PATENT AND TRADEMARK OFFICE
CERTIFICATE OF CORRECTION

PATENT NO. : 5,775,270
DATED : July 7, 1998
INVENTOR(S) : Gerhart Huemer et al.

It is certified that error appears in the above-indentified patent and that said Letters Patent is hereby corrected as shown below:

Title page,

Item [73] Change the Assignee data from "Behr Thermot-Tronik GmbH & Co., Kornwestheim, Germany" to --Bayerische Motoren Werke Aktiengesellschaft, Muenchen, Germany; Behr Thermot-Tronik GmbH & Co., Kornwestheim, Germany--.

Signed and Sealed this

Twenty-ninth Day of August, 2000

Attest:

Q. TODD DICKINSON

Attesting Officer

Director of Patents and Trademarks